US007908785B2

(12) United States Patent
Allen et al.

(10) Patent No.: US 7,908,785 B2
(45) Date of Patent: Mar. 22, 2011

(54) RECOIL MECHANISM AND DEVICE

(76) Inventors: Jon Allen, Portland, OR (US); Alan Bronson, Warren, OR (US)

(*) Notice: Subject to any disclaimer, the term of this patent is extended or adjusted under 35 U.S.C. 154(b) by 145 days.

(21) Appl. No.: 12/351,966

(22) Filed: Jan. 12, 2009

(65) Prior Publication Data

US 2010/0175302 A1 Jul. 15, 2010

(51) Int. Cl.
*A01M 31/06* (2006.01)
(52) U.S. Cl. .............................................. 43/3
(58) Field of Classification Search ............. 43/3, 2
See application file for complete search history.

(56) References Cited

U.S. PATENT DOCUMENTS

| | | | | |
|---|---|---|---|---|
| 74,458 A | * | 2/1868 | Wales | 43/3 |
| 378,410 A | * | 2/1888 | Trimble | 43/3 |
| 547,553 A | * | 10/1895 | Keller | 43/3 |
| 740,293 A | * | 9/1903 | Loeble | 43/3 |
| 843,588 A | * | 2/1907 | Ditto | 43/3 |
| 1,468,979 A | * | 9/1923 | Sherman et al. | 43/3 |
| 1,831,286 A | * | 11/1931 | Chelini | 43/3 |
| 2,413,418 A | * | 12/1946 | Rulison | 43/3 |
| 2,457,295 A | * | 12/1948 | Woodhead | 43/3 |
| 2,480,390 A | * | 8/1949 | Thompson | 43/3 |
| 2,663,108 A | * | 12/1953 | Dixon al. | 43/3 |
| 2,691,233 A | * | 10/1954 | Richardson | 43/3 |
| 2,747,316 A | * | 5/1956 | Benedetto | 43/3 |
| 2,752,715 A | * | 7/1956 | Miller | 43/3 |
| 2,787,074 A | * | 4/1957 | Miller | 43/3 |
| 3,537,205 A | * | 11/1970 | Robert | 43/3 |
| 3,927,485 A | * | 12/1975 | Thorsnes, Jr. | 43/3 |
| 4,128,958 A | * | 12/1978 | Snow | 43/3 |
| 4,356,928 A | * | 11/1982 | Stafford | 43/3 |
| 4,620,385 A | * | 11/1986 | Carranza et al. | 43/3 |
| 4,826,099 A | * | 5/1989 | Johnson | 43/3 |
| 4,965,953 A | * | 10/1990 | McKinney | 43/2 |
| 5,231,780 A | * | 8/1993 | Gazalski | 43/3 |
| 5,274,942 A | * | 1/1994 | Lanius | 43/3 |
| 5,375,363 A | * | 12/1994 | Higdon | 43/3 |
| 5,392,554 A | * | 2/1995 | Farstad et al. | 43/3 |
| 5,459,958 A | * | 10/1995 | Reinke | 43/2 |
| 5,636,466 A | * | 6/1997 | Davis | 43/3 |
| 6,021,594 A | * | 2/2000 | Krueger | 43/2 |
| 6,092,323 A | * | 7/2000 | McBride et al. | 43/3 |
| 6,170,188 B1 | * | 1/2001 | Mathews | 43/3 |
| 6,443,793 B1 | * | 9/2002 | Huebl et al. | 446/61 |
| 6,487,810 B1 | * | 12/2002 | Loughman | 43/2 |

(Continued)

FOREIGN PATENT DOCUMENTS

FR 2646588 A1 * 11/1990

(Continued)

*Primary Examiner* — Darren W Ark
(74) *Attorney, Agent, or Firm* — Peter A Haas Esquire LLC

(57) ABSTRACT

A non-motorized waterfowl decoy device includes a recoil mechanism adapted for use in a front-facing position or a rear-facing position. The recoil mechanism includes a rotatable spindle having a long axis about four times greater than its diameter. The recoil mechanism further includes a elastic drive member adapted to slidably couple into a pair of corresponding slots on the spindle and engage a rear-support post having a u-shaped alignment channel. A pull cord attached to the spindle causes the spindle to rotate and coil the elastic drive member. Positioning the pull cord through a provided aperture on the rear guide-post enables reward-facing operation and, positioning the pull cord through a provided aperture on a front guide posts enables forward-facing operation.

10 Claims, 5 Drawing Sheets

U.S. PATENT DOCUMENTS

| | | | | |
|---|---|---|---|---|
| 6,487,811 | B2 * | 12/2002 | Barrett | 43/3 |
| 6,665,975 | B2 * | 12/2003 | Porter | 43/3 |
| 6,708,440 | B2 * | 3/2004 | Summers et al. | 43/2 |
| 6,715,228 | B1 * | 4/2004 | Price | 43/3 |
| 6,760,993 | B2 * | 7/2004 | Lebens | 43/3 |
| 6,775,943 | B2 * | 8/2004 | Loughman | 43/3 |
| 6,845,586 | B1 * | 1/2005 | Brock, IV | 43/3 |
| 7,131,230 | B1 * | 11/2006 | Gilsdorf | 43/3 |
| 7,225,579 | B2 * | 6/2007 | Haley | 43/3 |
| 7,562,487 | B2 * | 7/2009 | Barr | 43/2 |
| 2004/0025400 | A1 * | 2/2004 | Salato | 43/3 |
| 2004/0250461 | A1 * | 12/2004 | Dryer | 43/2 |
| 2005/0132632 | A1 * | 6/2005 | Fisher | 43/3 |
| 2008/0010892 | A1 * | 1/2008 | Goebel | 43/2 |
| 2009/0107026 | A1 * | 4/2009 | Wyant | 43/2 |
| 2010/0064569 | A1 * | 3/2010 | Wyant | 43/2 |
| 2010/0115818 | A1 * | 5/2010 | Rogers | 43/2 |

FOREIGN PATENT DOCUMENTS

| | | | |
|---|---|---|---|
| FR | 2671691 A1 | * | 7/1992 |
| GB | 2067064 A | * | 7/1981 |
| GB | 2124464 A | * | 2/1984 |
| GB | 2230171 A | * | 10/1990 |
| GB | 2295953 A | * | 6/1996 |

* cited by examiner

RECOIL MECHANISM AND DEVICE

BACKGROUND

The present invention relates to recoil devices for motion decoys and particularly to a non-motorized recoil device for a waterfowl decoy.

One of the most enduring and legal hunting methods for attracting waterfowl is through the use of a decoy that mimics the appearance of the targeted waterfowl. The use of both live and artificial decoys in the United States by native North Americans for waterfowl hunting is documented back over one-thousand years. However, the practice of using live decoys has been abolished at the federal and state levels since the Migratory Bird Treaty Act of 1918. And the use of artificial decoys has grown ever since.

Early artificial decoys were expertly carved from wood and painstakenly hand painted. Over time motion was added to the artificial decoys. More recently (since the introduction of low-cost materials and manufacturing methods introduced in the 1950's) today's waterfowl hunter uses life-like (in appearance) decoys that emulate wing movement using wind, or recoil-type mechanisms.

Newer technologies in artificial decoys include motorized waterfowl decoys that generally have a spinning wing or blade apparatus revolving at a high speed, imitating the movement of waterfowl as they stretch their wings, landing, or move about. Other decoy types vibrate in water to imitate the movement of birds feeding. And yet others include a plurality of decoys attached to a common post and move around a central axis and alternately dive and surface to imitate a flock of feeding ducks. Examples of electric-motorized decoys (motors that require a power-source such as a battery, as distinguished from recoil devices) include the device disclosed in U.S. Pat. No. 6,092,323 to McBride et al. issued on 25 Jun. 2000.

Motorized decoys using on-board batteries present a number of environmental concerns in the manufacture and disposal. But, more specific concerns about the use of motorized decoys come from the various state and federal agencies stewarding waterfowl. Some agencies are concerned about the "fair chase" of the prey: For example, The Washington Commission of Fish and Wildlife and Washington State adopted regulations that prohibited the use of all electronic decoys. Others are concerned about the overall harvest of waterfowl: California, for example, concerned about increasing harvest rates of local mallards also banned electronic decoys. Currently, there is increased concern in the recreational hunting community that additional states or the federal government will outright ban electric-motorized decoys. Thus, there remains a need for non-electric-motorized decoys that emulate real-life appearance and movement of waterfowl.

One prior-art attempt to provide a non-motorized waterfowl decoy includes The Automatic Cord Reel For Duck Decoys described by Johnson in U.S. Pat. No. 4,826,099 issued on 2 May 1989. The Johnson device includes a cord reel for automatically winding a decoy cord. The reel has a hollow center and a bore extending from the surface of the reel to the hollow center. A rubber band extends through the reel's hollow center and attaches at either end to a housing. When the cord is pulled, the reel unwinds to release the cord thereby twisting the rubber band. The twisted rubber band exerts a torsional force on the reel, which automatically rewinds the cord when the pulling force on the cord is sufficiently diminished.

One limitation of the Johnson device lies in the recoil-mechanism. Specifically, the attaching of the cord (12) and elastic (26) to the reel (22) presents a problem: One end of the cord must first be passed through the bore (34), which extends from the surface of the reel to its hollow center. A tab (36) is then inserted into the mid-portion of the elastic band and the cord is tied around both the band and the tab, as best illustrated in FIG. 7 (of Johnson). This attaching point requires a tremendous amount of dexterity and patience on the part of the hunter or person assembling the device. As can be well appreciated by those accustomed to repairing decoys in a small boat, or along a marshy shore, such a repair—should the elastic band break—an all-to-common occurrence in real-world conditions—is practically impossible. The relatively small size of the components further makes an in-the-field repair impractical. Additionally, the reel (22) is overly narrow, which requires precise alignment of the cord, and does not allow for knotted, or debris-strewn cords. Such conditions cause the reel to jam. Thus, there remains a need for a recoil-mechanism that is more robust and easier to repair in-the-field.

Another recoil device, described in U.S. Pat. No. 6,487,811 to Barrett issued on 3 Dec. 2002, includes a waterfowl decoy with a self-retracting anchor line. Barrett describes a body defining a closed interior space in which a spring-biased anchor line reel disposes. An anchor line is wound on the reel and trained out of the body through a port in the breast of the body. A spring-biased, manually actuatable lock-member is disposed in the bore formed in the body at the breast and includes a passage through which the anchor line is trained and normally snubbed between the lock member and the decoy body. Similar to the aforementioned Johnson decoy, the Barrett decoy employs a narrow, vertically aligned reel mechanism (24) and this narrow reel presents the same problems previously discussed. To better align the cord, the Barrett device includes a small port (23) on the breast of the decoy body. This narrow port can easily become jammed, rendering the decoy non-functional. In addition, in real-world use the cord does not always train on the reel, which is exasperated by the narrowness of the reel and relatively high side-walls of the reel. And, the cord can jump the sidewalls of the reel and entangle on the axle. This requires the user to repair the decoy in the field under sub-optimal conditions. Further, the biasing spring, although considerably more robust than the rubber-band of Johnson, eventually will corrode or fatigue from use, necessitating a costly repair utilizing specialty components that makes it practically impossible to service in the field. Thus, there remains still a need for an improved recoil mechanism that is less-prone to jams and cord-tangles, uses less components, is of a simpler design, and provides easier field-repairs.

Another example of a non-motorized recoil device includes the Motion Decoy of Porter disclosed in U.S. Pat. No. 6,665,975 issued on 23 Dec. 2003. Porter describes a motion waterfowl decoy including a pair of wings mounted to an axle such that the wings rotate with the axle. A pull cord winds about the axle so that the unwinding cord will spin the axle and wings. A biasing device such as a length of rubber or latex tubing or spring is attached to the axle. The Porter device provides a spindle axle (2), which is biased against rotation in a first direction by a latex surgical tubing (4). The tubing is secured to the body of the decoy at a first end (of the tubing), and the opposite, second end (61) secures to the axle so that the rotation of the axle will cause the surgical tubing to be wrapped around the same axle (2), thus loading the elastic surgical tubing. Alternatively, the axle (2) is biased by a torsion spring. However, one limitation of the Porter device regardless of biasing means arises in the attaching of the biasing means to the axle. Porter does not specify the attaching means and current state of the art attaching means includes looping the end around the axle and securing the loose end to itself around the axle or providing an axle with a through hole and inserting the free end through the through hole and knotting the free end around a portion of the axle and tying the free end to itself. Over time the pull-string, the biasing-means, or both will wear and require repair or replacement and tying a knot on a relatively small diameter cord when fatigued, cold, or both—common conditions of the hunter when hunting along the near-frozen, wet marsh land— is a practical impossibility. Further, Porter includes a guide hole (7) through which the cord must pass. As previously discussed, such a small bore hole can result in a non-functioning decoy when the cord becomes tangled, knotted or debris-strewn. Thus, there remains a need for a more robust recoil-mechanism that can be easily, quickly, and cost-effectively repaired in the field.

Despite the advances in non-electrical recoil-type decoys, there remains a need for a waterfowl decoy that incorporates a more reliable, more economical-to-produce, easier-to-repair, more-efficient, and simpler recoil mechanism for waterfowl decoys. Such a device should further include means to better emulate the natural movement of the waterfowl. And, such a device should provide means for using the decoy when the hunter is stationed in front of or behind the decoy.

SUMMARY OF THE INVENTION

Preferred embodiments of the present invention include a waterfowl motion decoy that improves over the existing state-of-the-art and solves problems and adds features not contemplated, taught, or suggested by the representational references discussed above. Some features of the various preferred embodiments of the present invention include a non-motorized recoil mechanism attached to a shell resembling Mallards, Widgeon, Pintail, Gadwall, Teal and other Pacific Flyway ducks along with the seven sub species of Canadian Geese, Snow Geese, Speckel-bellied Geese, and other Pacific Flyway Geese, for example. Or, more generally, waterfowl decoy shells known in the art. The non-motorized recoil device of preferred embodiments of the present invention enables a hunter to operate the device via an attached pull-cord when the decoy is either facing (forward facing) the hunter or is turned away (rearward-facing) from the hunter.

Additional features of the present invention include an elastic drive member that is well-suited for field repair combined with a design for attaching the drive member to a rotatable shaft. Elastic drive member includes known materials including, but not limited to, natural or synthetic rubber, latex, or other suitable combinations of material. The rotatable shaft includes a pair of slots adapted to slideably receive a respective knotted end of the elastic drive member. Further, the large surface area of the spindle ensures that the pull cord easily winds around the spindle and prevents jams common in the prior art.

Other key features of preferred embodiments of the present invention include hardware fabricated from stainless steel or 6061 Aluminum. One possible bushing material includes an oillette self-lubricating bronze bushing. Preferably, the various components consist of stainless steel or Aluminum to provide durability and prevent corrosion for years of use and serviceability with limited maintenance. Accordingly, a preferred embodiment constructed with such materials requires minimal maintenance comprising simply to clean and rinse the components with salt-fee water after use in saltwater environments. No oil or grease-filled bears are used and, therefore, the rotating components will not gum up or slow down in cold weather. There is no center pulley wheel for the pull line to jump off and become fouled and tangled. All parts are machined within about 0.010-inch tolerances. The front, middle and rear posts have precise holes positioned to allow forward facing or rear facing operation. The rear post also has a machined grove that goes around the post to provide a smooth slot for the drive band to rest in.

One embodiment of the present invention includes a recoil mechanism comprising:
  a plate member;
  a front guide member coupled to the plate member and arranged adjacent to a front portion of the plate, the front guide member further defining a guide-hole, the guide hole extending through the front guide member;
  a spindle rotatably mounted to the plate member, the spindle being disposed generally perpendicular in relation to an opening defined by the guide-hole of the front guide member, the spindle further comprising a first and second slot, each slot arranged at opposite ends of the spindle and extending generally parallel to a long-axis of the spindle, each slot extending from the respective end to an intermediate distance along the spindle surface, the intermediate distance being less than half of the spindle length;
  a rear drive post coupled to the plate member adjacent to a rear edge of the plate, the rear drive post defining a rear-guide hole extending through the drive post and arranged generally parallel to the guide-hole of the front guide member; and
  an elastic drive member adapted to arrange around the rear drive post and further having a pair of oppositely spaced end, each end adapted to to slide into the slot presented by the spindle whereby rotation of the spindle causes the elastic drive member to wind around the spindle.

This mechanism further comprising:
  a pull cord having a first cord end arranged through a passage on the spindle and having at least one wind wound around the spindle whereby a pulling force on the pull cord causes the spindle to rotate.

This mechanism further comprising:
  a center post coupled to the plate member arranged generally about the center of mass of the plate, the center post defining a center-guide hole, the center-guide hole arranged generally parallel to the guide-hole of the front guide member.

This mechanism further comprising:
  at least one rotatable shaft adapted to couple to the spindle whereby rotation of the spindle corresponds to rotation of the shaft.

This mechanism wherein the rear driver post further comprises:
  a circumferencially arranged u-shaped channel adapted to help retain the elastic drive member.

DRAWING

DESCRIPTION OF THE INVENTION

Possible preferred embodiments will now be described with reference to the drawings and those skilled in the art will understand that alternative configurations and combinations of components may be substituted without subtracting from the invention. Also, in some figures certain components are omitted to more clearly illustrate the invention.

Figure 1:
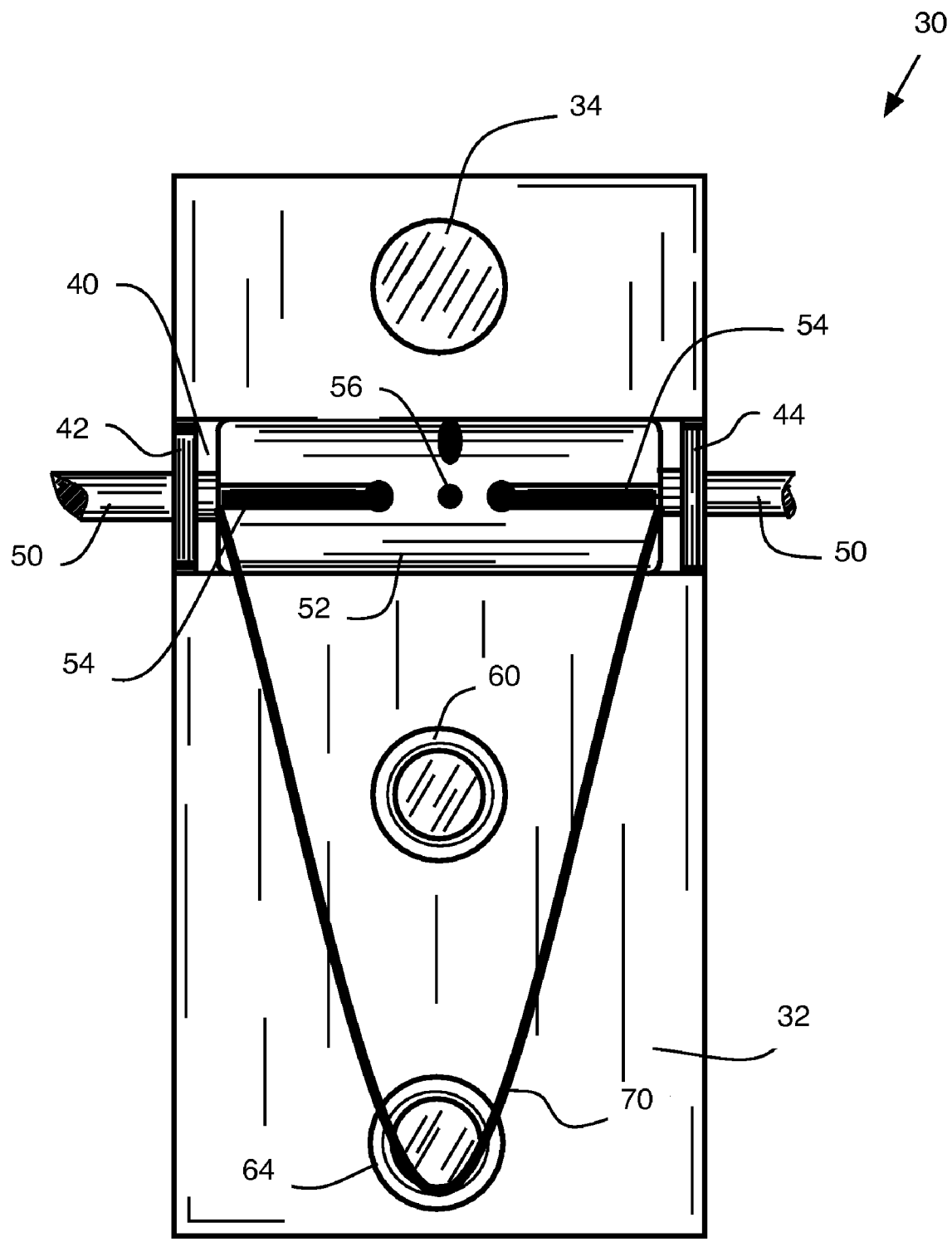
FIG. 1 is a top view of a recoil mechanism according to a first preferred embodiment of the present invention.
Figure 2:
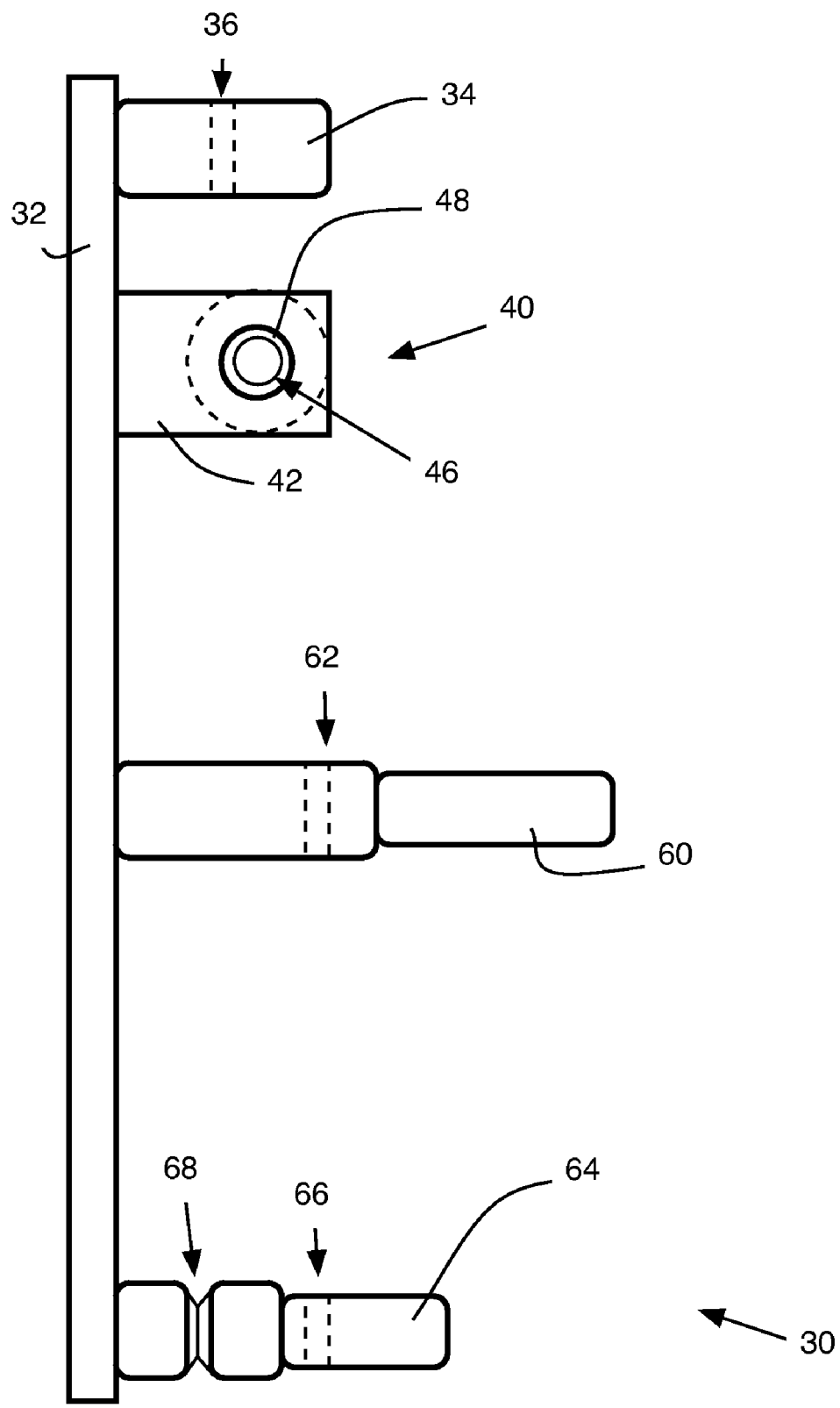
FIG. 2 is a left side view of the recoil mechanism of FIG. 1.

FIGS. 1 and 2 illustrate a first preferred embodiment of the present invention. The present invention comprises a non-motorized recoil mechanism 30 adapted for waterfowl decoys. Accordingly a flat plate member 32 adapts to couple to a standard or customized waterfowl body shell as would be understood in the art. One particularly well-suited plate member includes a generally flat piece of aluminum alloy measuring approximately 10-inches by about 3-inches and having a thickness of about ⅛-inch, which corresponds to a common bar stock as used in the relevant art. The plate member includes various through holes or other mounting features adapted to facilitate coupling or attaching various components by known fastening means including, but not limited to, welding, adhering, riveting, or releasable coupling means including, but not limited to, screwing, nuts and bolts, or other well-understood coupling means.

Projecting from a horizontal plane established by a top surface of the plate member 32, a front guide member 34 couples to the plate member adjacent to a front portion of the plate. The front guide member further defines a guide-hole 36 extending through the body of the front guide member. One particularly well-suited guide member consists of a generally cylindrical and solid column member having an outer diameter of about ¾-inch and having a height of about 1.4-inches fabricated from aluminum alloy round bar stock, for example. The front guide-hole 36 is particularly arranged to enable a cord member to pass therethrough and to present the cord to the next component (the spindle, described below): Accordingly, the front guide-hole disposes on the front guide member present an opening generally parallel to a front edge of the flat plate member 32, and to form a generally straight channel through the guide post and having a second, opposite opening on the post at the point nearest to (and therefore perpendicular to) the spindle. This guide-post with guide-hole, therefore, replaces the fragile guide hole found on many prior-art waterfowl decoy shells, for example. And, because the front guide-post is fabricated from a durable and strong material, it is far less subject to damage when compared to the guide-holes common in the prior art.

The next component of the first preferred embodiment's non-motorized recoil device, the spindle assembly 40, arranges adjacent to the front guide-post 34. The spindle assembly includes a spindle 52 rotatably mounted to the plate member 32 and being disposed generally perpendicular in relation to the guide-hole 36 of the front guide member. The spindle 52 further includes a first and second elongated slot 54, each slot arranged at opposite ends of the spindle and extending generally parallel to a long-axis of the spindle. Each respective slot (using the common reference numeral 54 in the drawing) extends from its respective end of the spindle to an intermediate distance along the spindle surface, the intermediate distance being less than half of the spindle length.

The spindle assembly 40 includes a squared-U-shaped mounting bracket having a backing plate coupled to the flat plate 32 and two oppositely positioned vertical arms 42 and 44 extending upward from the backing plate. The two vertical arms arrange at the extreme far left and right ends of the backing plate are separated approximately the same distance apart as the flat plate 32 is wide. Each respective vertical arm defines a through hole 46 adapted to receive a bushing member 48. One well-adapted bushing member includes a brass bushing available from Isostatic Industries, Inc. of Chicago, Ill. 60641 USA, part number FL-26-2, for example. The bushing member 48 and corresponding aperture 46 are adapted to rotatably receive a rotating shaft member 50, which couples to the spindle 52 whereby rotation of the spindle results in a corresponding rotation of the shaft member. Although depicted herein as a solid, single piece shaft consisting of a circular rod, other shaft designs would work equally well including separate shafts for the left and right sides, a square shaft (in cross-section), solid or hollow, for example.

In a preferred embodiment of the present invention, a waterfowl decoy includes unique and novel wing assemblies including a left and right wing or a pair of symmetric and interchangeable wings. Each wing 100 is balanced to provide smooth operation when rotated by the shaft 50. Each wing assembly 100 includes a wing-surface member 102 shaped and sized in scale with the decoy. A first surface of the wing member 102 is colored white and a second, opposite surface is colored black to enhance the visual affect of the rotating wing to attract waterfowl. Other color combinations may work equally well. The wing assembly 100 further includes a spine member (not shown in the drawings) to add support and rigidity to the wing surface 102 and to otherwise facilitate mounting the wing to the decoy assembly. The spine inserts into a wing-adapter 104. The wing adapter 104 is a cylindrical member machined from aluminum alloy. At one end, the wing adapter provides a bore adapted to receive the spine and the spine is fixably coupled to the adapter with an epoxy and a set-screw, although other fastening means may work equally well. At an opposite end, the wing adapter 104 includes a second bore adapted to receive the shaft 50. To enable releasable coupling of the shaft to the adapter, a thumb-screw 106 positions on the exterior surface of the adapter, aligning with a threaded hole specifically adapted for this purpose. Thus, the wing assembly can quickly and easily be removed from the shaft as required for set up and tear down in the field. This present design offers superior characteristics over the prior-art wing designs. Such improvements include a more balanced spinning wing, a more robust design that improves the durability of the wing, and easier fastening of the wing to the shaft, for example. The wing surface 102, in a preferred embodiment, consists of a plastic material such as a corrugated and fluted polypropylene material commonly available.

The spindle 52 further includes a passage 56 adapted to receive a pull cord. The passage 56 defined by two opposite through holes and cooperating channel arranges slightly offset from the midline of the spindle body's length and need not pass through the center of rotation of the spindle. Thus, a pull cord that passes through this passage 56 and is secured can easily be wound around the spindle.

This first preferred embodiment of a non-motorized recoil mechanism further includes a rear drive post 64 coupled to the plate member 32 adjacent to a rear edge of the plate. The rear drive post defines a rear-guide hole 66 extending through the drive post and arranged generally parallel to the guide-hole 36 of the front guide member 34. The rear drive post further comprises a circumferencially arranged v-notch or u-shaped channel 68, which is a adapted to receive an elastic drive member 70. In this contemplated embodiment, the rear guide member consists of a cylindrical and solid round bar stock aluminum alloy having a height of about 1.975-inches and a diameter of about ¾-inch. A v-shaped or u-shaped notch having a diameter of 0.250-inches disposes about 1.438-inches measured from the top. A top-portion of the rear post has a smaller diameter than its bottom portion, the top-portion measuring about 0.545-inches in diameter and about 0.900-inches in length.

The elastic drive member 70 further includes two, oppositely spaced ends. Each end adapts to slide into the slot presented by the spindle. Accordingly each end is knotted to enable insertion in the slot without the end inadvertently retracting from the slot as tension is added. Thus, rotation of the spindle causes the elastic drive member to wind around the spindle. One suitable drive member includes a black, UV-protected latex rubber tubing having dimensions of about 3/32-inch inner diameter by about 1/32-inch wall thickness by about 5/32-inch outer diameter available from Kent Elastomer Products, Inc of Kent, Ohio, USA, for example.

Additionally, the recoil mechanism of this first preferred embodiment further includes a pull-cord 80. The pull cord 80 has a first cord end arranged through the passage 56 on the spindle 52 and has at least one wind wound around the spindle whereby a pulling force on the pull cord causes the spindle to rotate. One well-suited pull cord consists of a nylon rope consists of a nylon rope or cord approximately about 1/16-inch in diameter, having 3-strands and dark in color as would be generally available in most hardware or sporting-good stores throughout the United States.

In another preferred embodiment of the present invention, the recoil mechanism as just described further includes a center post 60 coupled to the plate member arranged generally about the center of mass of the plate, the center post defining a center-guide hole 62, the center-guide hole arranged generally parallel to the guide-hole of the front guide member. The center guide-post has a height greater than either the front or rear guide post and includes a top portion adapted to fit on an anchored mount to present the mechanism at a pre-defined height (when measured from the water line when used in a waterfowl decoy) to present the mechanism in a desired position relative to the shell.

In yet another preferred embodiment of the present invention, the non-motorized recoil mechanisms previously described adapt to cooperate with a waterfowl decoy body shell. One particularly well-suited body shell is available form G&H Decoys, part number K10/40 Mallard Field Show, Henryetta Okla., USA. The shell 12 includes at least one sidewall 14 defining a first wing-aperture 16 and a second wing-aperture 18, the second wing-aperture being disposed on the shell opposite the first wing-aperture. The shell further defining a U-shaped slot 20 disposed on a front portion of the shell. The slot having two generally parallel edges, each edge extending downward from a top edge of the shell and the u-portion of the slot being disposed adjacent to a bottom sidewall of the shell.

When hunting waterfowl, in particular ducks, the hunter tries to create an environment that attracts flying birds to land nearby a blind. Typically, such a blind situates near a body of water such as a river, lake, or pond. Decoys, properly positioned, attract overpassing birds, which then attempt to land near the decoys. And decoys with articulating wings better attract the targeted waterfowl as the rotating wings attract the attention of the overpassing birds and create ripples on the water, which further attracts the target prey. To facilitate landing, ducks face into the wind. Thus, for an artificial decoy to best emulate natural conditions, the decoys need to position facing the wind. However, because the wind direction changes relative to the static location of the hunter's blind, the decoy must also change direction for the best effect. The state-of-the-art artificial decoys enable the hunter to operate the wing rotation by a pull string only when the front of the decoy faces the hunter. To overcome this limitation, the present invention includes structures that enable operation from behind the decoy or, alternatively, to enable a weighted line to run perpendicular to the decoy (straight down) and then over to the blind (to hide the cord under the waterline, for example).

Figure 3:
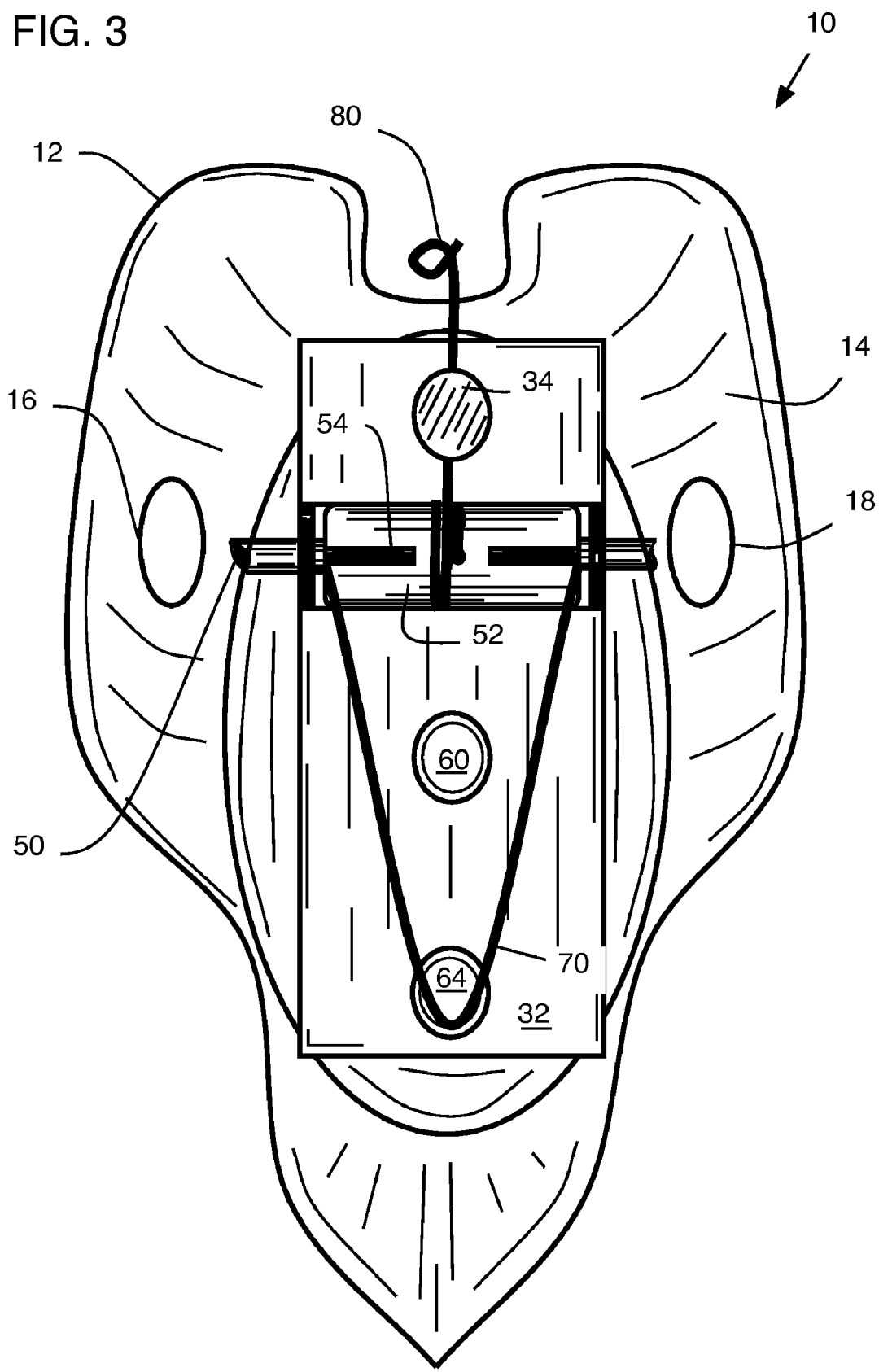
FIG. 3 is a top view of a waterfowl decoy and recoil mechanism according to a second preferred embodiment of the present invention.
Figure 4:
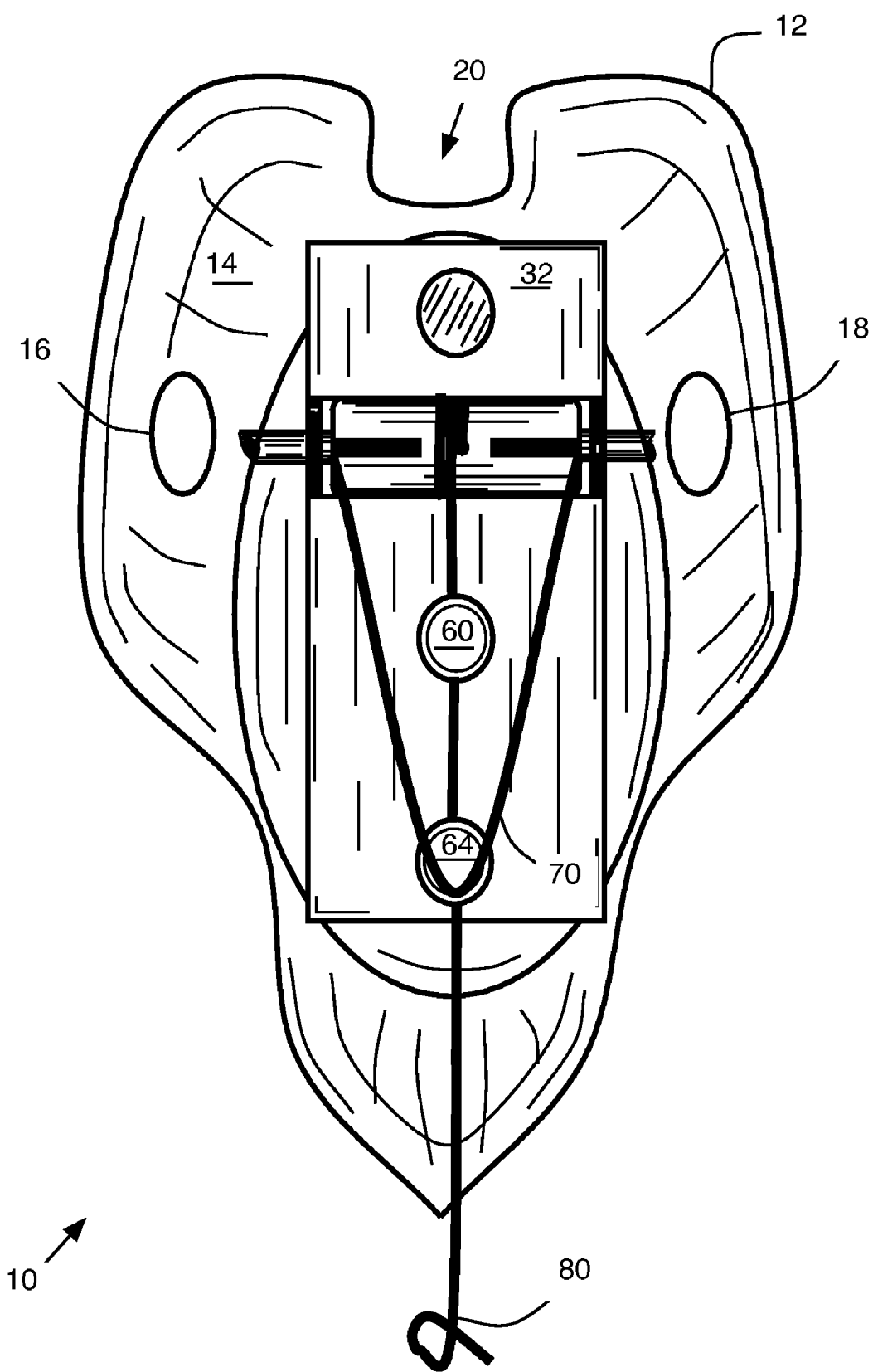
FIG. 4 is a top view of a waterfowl decoy and recoil mechanism according to a third preferred embodiment of the present invention.
Figure 5:
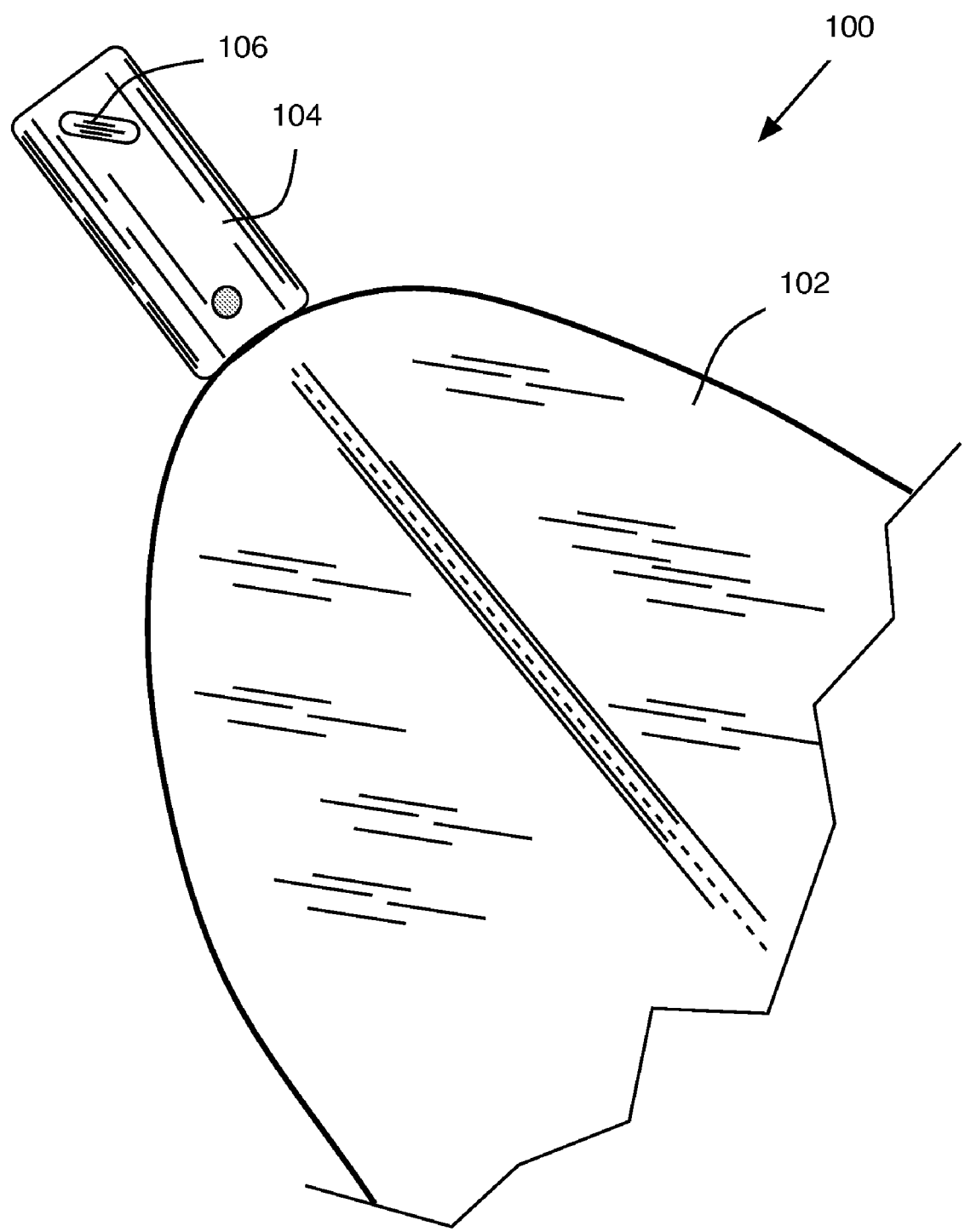
FIG. 5 is a partial top view of a wing assembly according to a preferred embodiment of the present invention.

FIGS. 3 and 4 illustrate unique elements of preferred embodiments of the present invention that enable the hunter to operate the recoil mechanism from the front (FIG. 3) and from behind (FIG. 4).

FIG. 3 shows a preferred embodiment of the present invention 10 including a recoil mechanism and a shell housing 12 resembling an upper portion of a species of waterfowl. A pull-cord 80 arranges to the front of the shell 12 for a standard or typical front-facing operation (the decoy is generally facing the hunter). The pull cord feeds through the front guide post 34 at a through bore on the post adapted for this use. The cord emerges from the front guide post to engage the spindle 52 and is wound around the spindle (at least one wind, preferably two or three winds). The spindle includes a passage for the cord to pass through and the end of the cord is tied onto itself. Thus a pulling force on the end of the cord opposite the spindle results in the spindle rotating in the direction of the pull force. An elastic band member 70 adapts to fit in a pair of oppositely spaced elongated slots 54 arranged on the surface of the spindle and the elastic is further stretched around a rear drive post 64. This elastic so configured is in tension. Accordingly, when the cord is pulled, the elastic wraps around the spindle as the rear-drive post is securely fixed or coupled to the plate 32 (and the spindle is fixably coupled, however rotatably to the same plate). Because the shell 12 includes a large opening on a front portion (reference item 20 in FIG. 4, for example), the cord can operate from a wide range of directions from the front of the decoy. Thus, the hunter need-not align themselves directly facing the decoy, but can position the decoy facing the wind.

In contrast, FIG. 4 shows another preferred embodiment of the present invention 10 wherein the hunter operates the recoil mechanism from the rear of the decoy. Thus, when the wind shifts, the decoy can be re-aligned to face the wind and the hunter can operate the recoil mechanism from behind the decoy. To accomplish this, the improved recoil mechanism and device 10 includes a body shell 12 having wing apertures 16 and 18 and a large opening 20 on the front portion. The shell resembles the upper body portion of a species of waterfowl decoy common in this art. The recoil mechanism includes an elastic drive member 70 coupled to a pair of cooperating elongated slots 54 arranged on the spindle and around the rear drive post 64, which causes tension the elastic member. A pull cord 80 winds a few times around the spindle and then is directed rearward, passing through an optional center post 60 via an included through-bore. And also through the rear drive post 64, which also includes a through-bore adapted for this purpose. In this manner, a hunter simply pulls the cord. This causes the spindle to rotate and further tighten the drive member 70. Releasing the cord enables the drive member to rotate the spindle in the opposite direction.

In the various embodiments (as depicted in FIGS. 1, 2, 3, and 4) an optional center post 60 is included. This post can be omitted without affecting operation of the recoil mechanisms discussed herein. However, one benefit of the center post includes enabling the decoy to be mounted on a stake extending from the waterline to the bottom of the pond, river, or lake.

Although the various guide posts are described herein as cylindrical and solid members, it should be understood that alternative shapes, sizes, and configurations could work equally well including both solid and hollow members. Also, although aluminum alloy is a preferred material for many of the components, other materials including metals, alloys, composites, for example, could easily be substituted without deterring from the intent of the present invention.

And, although the invention has been particularly shown and described with reference to certain embodiments, it will be understood by those skilled in the art that various changes in form and detail may be made without departing from the spirit and scope of the invention.

We claim:

1. A motion decoy comprising:
   an external body shell adapted to resemble an upper body-portion of a species of waterfowl;
      wherein the shell includes at least one sidewall defining a first wing-aperture and a second wing-aperture, and the shell further defining an opening on a front portion of the shell,
   and; a recoil mechanism comprising:
      a plate member adapted to couple to the shell,
      a front guide member coupled to the plate member and arranged adjacent to a front portion of the plate, the front guide member further defining a guide-hole, the guide hole extending through the front guide member and arranged to align with the opening on the front portion of the shell,
      a spindle rotatably mounted to the plate member, the spindle arranged generally perpendicular to a long axis of the plate, the spindle further comprising a first slot and a second slot, each slot arranged at opposite ends of the spindle and extending generally parallel to a long-axis of the spindle, each slot extending from the respective end to an intermediate distance along the spindle surface, the intermediate distance being less than half of a spindle length,
      a rear drive post coupled to the plate member adjacent to a rear edge of the plate, the rear drive post comprising a generally cylindrical member defining a rear-guide hole extending through the drive post and arranged generally parallel to the guide-hole of the front guide member, the rear drive post further comprising a circumferentially arranged u-shaped channel, and
      an elastic drive member comprising a resilient tube having a pair of oppositely spaced ends, each end being adapted to engage one of the first and second slots presented by the spindle whereby rotation of the spindle causes the elastic drive member to wind around the spindle.

2. The motion decoy of claim 1 further comprising:
   a spindle support frame coupled to the plate member, the spindle support frame being disposed adjacent to the front-guide member, the spindle support frame comprising a bracket including a first vertical arm and a second vertical arm, each vertical arm including a through-bore adapted to receive a respective bushing member.

3. The motion decoy of claim 2 wherein the spindle further comprises:
   a cylindrical member having a length at least about four times greater than its diameter and adapted to rotate, the spindle being disposed intermediate to the first and second vertical arms of the spindle support frame and the spindle being disposed generally perpendicular in relation to the guide-hole of the front guide member, the spindle further comprising a center passage comprising opposite through-hole, the passage extending through a portion of the spindle.

4. The motion decoy of claim 1 further comprising:
   a pull cord having a first cord end arranged through a passage on the spindle and having at least one wind around the spindle whereby a pulling force on the pull cord causes the spindle to rotate.

5. The motion decoy of claim 1 further comprising:
   at least one rotating shaft adapted to couple to the spindle whereby rotation of the spindle results in corresponding rotation of the at least one rotating shaft, the at least one rotating shaft further adapted to pass through the first wing-aperture.

6. The motion decoy of claim 5 further comprising:
   a wing assembly adapted to couple to the at least one shaft.

7. The motion decoy of claim 5 further comprising:
   a wing assembly comprising
      a wing-surface member;
      a spine member coupled to the wing surface member;
      a wing-adapter having a first end comprising a first bore adapted to receive the spine member, and an opposite, second end comprising a second bore adapted to receive the at least one rotating shaft.

8. The motion decoy of claim 7 further comprising:
   a thumb-screw disposed on an exterior surface of the wing-adapter, the wing adapter further comprising a threaded hole specifically adapted for use by the thumb-screw.

9. The motion decoy of claim 1 further comprising:
   a center post coupled to the plate member arranged generally about a center of mass of the plate, the center post defining a center-guide hole, the center-guide hole passing through a center of the center post and arranged generally parallel to the guide-hole of the front guide member.

10. The motion decoy of claim 1 wherein the opening on the front portion of the shell further comprises:
    a U-shaped slot disposed on the front portion of the shell, the U-shaped slot having two generally parallel edges, each edge extending downward from a top edge of the shell and a curved, bottom-u-portion of the U-shaped slot being disposed adjacent to a bottom sidewall of the shell.

* * * * *